March 25, 1952     H. S. WILLIAMS     2,590,742
APPARATUS FOR WRAPPING POTTED PLANTS
Filed Oct. 5, 1949     2 SHEETS—SHEET 1
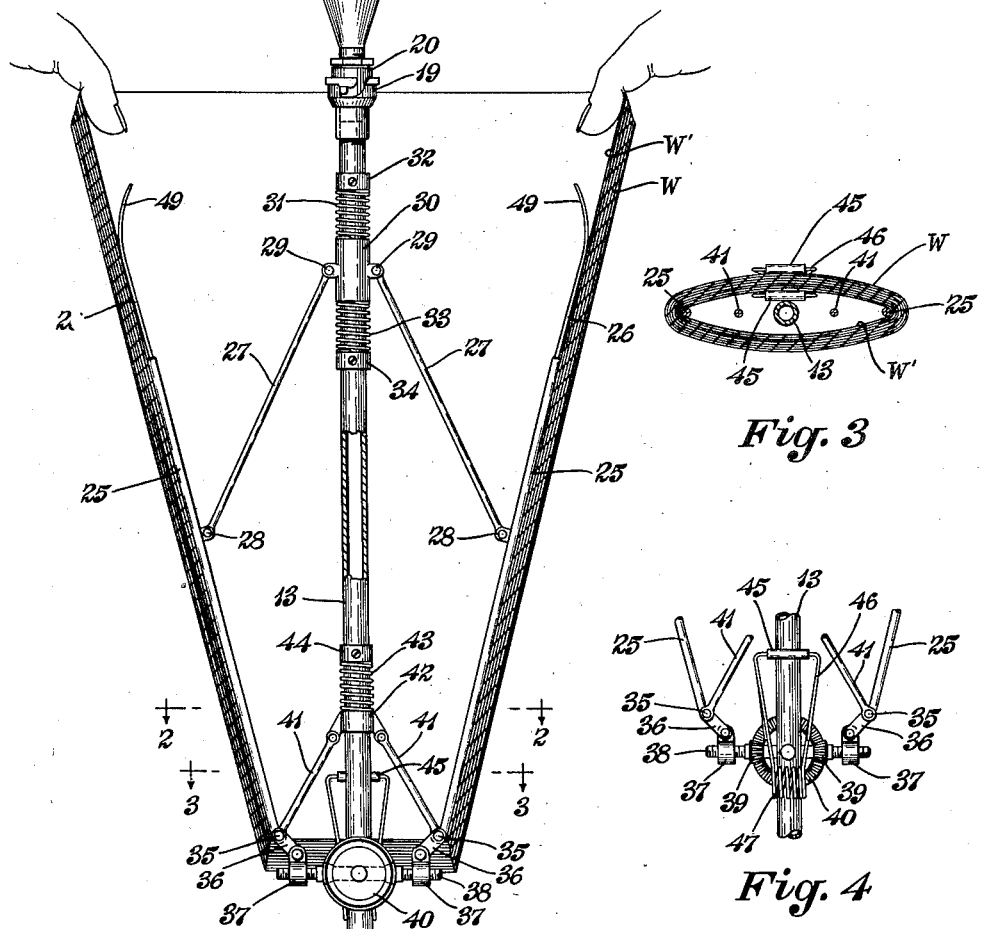
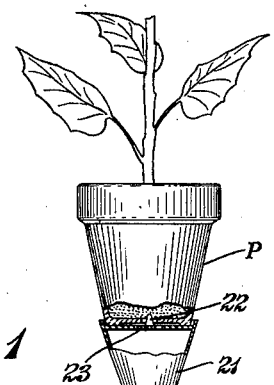
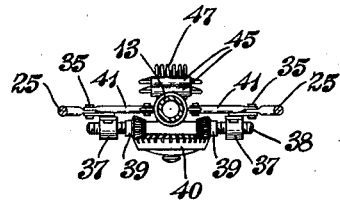
INVENTOR.
Henry S. Williams
BY
ATTORNEYS March 25, 1952 H. S. WILLIAMS 2,590,742
APPARATUS FOR WRAPPING POTTED PLANTS
Filed Oct. 5, 1949 2 SHEETS—SHEET 2

INVENTOR.
Henry S. Williams
BY
ATTORNEYS

Patented Mar. 25, 1952

2,590,742

UNITED STATES PATENT OFFICE 2,590,742

APPARATUS FOR WRAPPING POTTED PLANTS

Henry S. Williams, Sharon, Pa.

Application October 5, 1949, Serial No. 119,675

8 Claims. (Cl. 226—18)

The invention relates generally to the operation of wrapping potted plants, and more particularly to a device for applying protective wrappers rapidly to large numbers of plants without injuring or disturbing their bloom or foliage.

In the floral industry potted plants may be wrapped and rewrapped by the grower, wholesaler, jobber and retailer, and such wrapping takes considerable time and subjects the plant to repeated handling which may bruise or injure its bloom or foliage, however carefully it is wrapped. In the conventional method of wrapping the plant is usually laid on its side and rolled in wrapping paper, and this operation not only tends to bruise or break the plant, but is apt to loosen the soil around its roots, especially if the wrapping is done hastily or carelessly.

During the holiday seasons when great numbers of plants are sold to the public, the wrapping operation causes troublesome delay and loss in sales, and in the rush of wrapping and handling abnormal quantities of plants, often with incompetent or careless help, a great many of the plants are improperly wrapped and injured.

Moreover, the conventional method of rolling the potted plants in wrapping paper requires large table tops which occupy valuable space in a crowded florist shop, for example; and if several people are simultaneously engaged in wrapping during a rush period, there is unavoidable congestion which further retards the wrapping operation and multiplies the amount of injury to the plants.

Accordingly, it is an object of the present invention to provide a novel means and method of rapidly applying wrappers to potted plants without injuring them in any way.

Another object is to provide a novel plant wrapping device which enables unskilled persons to wrap plants rapidly and safely, and also neatly.

Another object is to provide a novel plant wrapping device which requires a minimum amount of space.

A further object is to provide a novel plant wrapping device which enables wrapping potted plants quickly in a vertical position.

Another object is to provide a novel plant wrapping device which requires a minimum amount of handling of the plant and the wrapping material.

A further object is to provide a novel plant wrapping device utilizing novel tubular wrappers which do not require tying around the pot.

A still further object is to provide a novel plant wrapping device which provides a support for the plant in upright position during the wrapping operation, and which holds a plurality of nested wrappers in readiness for successive wrapping operations.

Finally, it is an object of the present invention to provide a simple, compact and inexpensive device for wrapping potted plants, which overcomes the disadvantages of prior plant wrapping operations and which accomplishes all of the foregoing objectives.

These and other objects are accomplished by the parts, improvements, devices, wrappers, and combinations which comprise the present invention, a preferred embodiment of which is shown in the accompanying drawings and described in the specification as exemplifying the best known mode of carrying out the invention, the invention being stated in general terms in the following general statement, and the scope of the invention being defined in the appended claims.

In general terms, the wrapping device of the present invention may be described as including a hollow column or pedestal mounted on a base with a drip pan in the base and an enlarged head on top of the column for supporting a flowerpot, there being a hole in the head for conducting water from the pot to the drip pan, a pair of spreader bars foldably mounted on an intermediate portion of the column and yieldingly held normally in extended V position, for holding a plurality of nested tapered tubular plant wrappers around the pedestal below the head in such manner that the inner wrapper may be raised until its small end fits tightly around the base of the pot supported on the head, and the bottom ends of the spreader bars being adjustable toward and away from each other for accommodating various sizes of the tubular wrappers.

Referring to the drawings, forming part hereof, in which a preferred embodiment of the invention is shown by way of example:

Fig. 1 is a front elevation, partly in section, of the plant wrapping device of the present invention, with a potted plant in position thereon to be wrapped and a pack of nested wrappers in position for successively wrapping potted plants;

Fig. 2 is a plan sectional view as on line 2—2, Fig. 1, with the wrappers removed;

Fig. 3 is a plan sectional view as on line 3—3, Fig. 1, with distant parts removed;

Fig. 4 is a fragmentary rear elevation at the lower end of the wrapper frame, with the wrappers removed;

Similar numerals refer to similar parts throughout the drawings.

Figure 5:
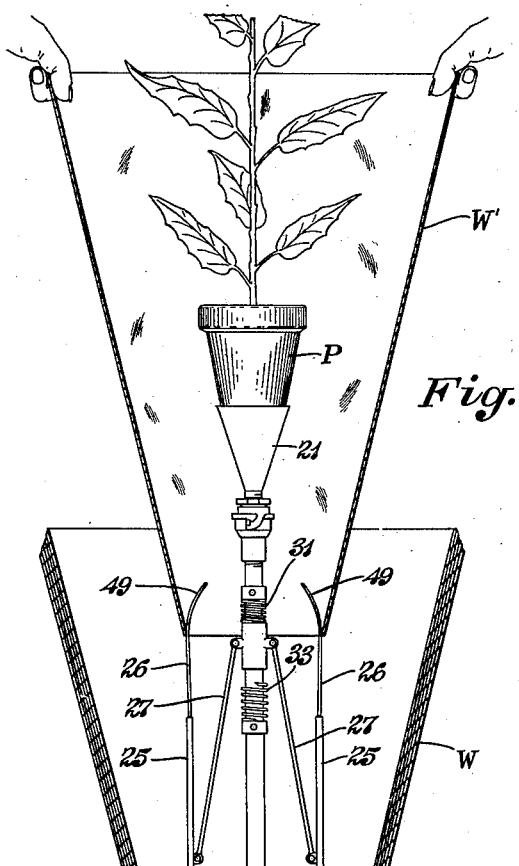
Fig. 5 is a fragmentary front elevation on a reduced scale, showing the innermost wrapper being pulled upwardly over the plant.

The novel plant wrapping device preferably includes a flat base 10 which may be made of sheet metal, and which preferably has a drip pan 11 provided with a handle 12 at one end, so that the pan can be pulled out and emptied from time to time, as desired. A tubular column or pedestal 13 is supported on the central portion of the base 19, and preferably the lower end of the column 13 has secured thereon the male portion 14 of a conventional bayonet joint. The part 14 is adapted to be detachably interlocked in the female part 15 of the joint by inserting the part 14 and giving it a quarter turn, in a well known manner. The joint part 15 is preferably secured on a tubular stub 16 which may have an annular flange 17 attached to the base by screws 18.

The upper end of the column 13 preferably has secured thereon the female part 19 of another bayonet joint, and the part 19 is adapted to receive the male part 20 which is secured on the bottom end of a conically shaped hollow head 21 adapted to support a flowerpot P on its top end. Preferably, the top of the head 21 has a pointed stud 22 projecting upwardly therefrom for being received within the usual hole in the bottom of the flowerpot when the same rests thereon. The stud 22 is mounted within a central hole 23 in the top wall of the head, by suitable spaced supporting ribs, so that if a potted plant covered with an ornamental foil wrapper is placed on the head, the stud 22 will puncture the wrapper and allow any accumulated moisture within the pot to drain through the hole 23 around the stud and thence downward through the column 13 and supporting stub 16 into the drip pan.

By means of the joint 19, 20 the head 21 can be quickly interchanged with another head of different size for supporting different sized pots, or with a head which does not have the pointed stud 22 and is used for supporting pots which are not provided with the bottom drain hole. By means of the joint 14, 15 the column 13 and the framework supported thereon can be quickly detached as indicated in Fig. 8, so that a nested pack of wrappers can be loaded onto the frame while it is detached.

Figure 8:
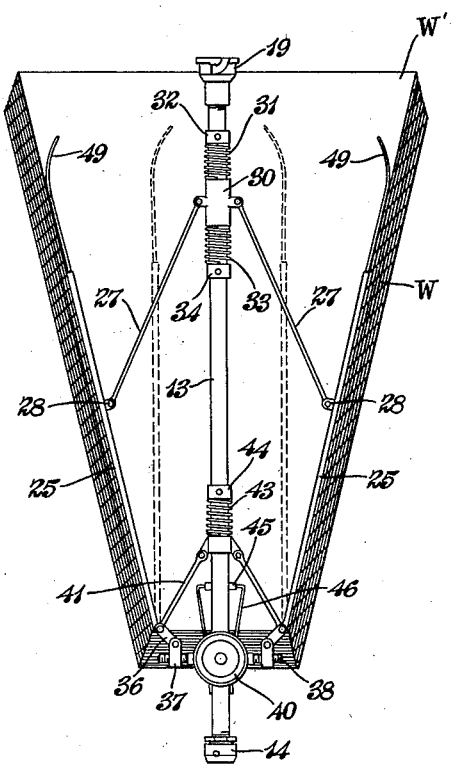
Fig. 8 is a view similar to Fig. 1, showing the the wrapper-supporting frame detached for being loaded with a pack of wrappers.

The foldable frame, for supporting a pack of nested wrappers W in position to be successively pulled upwardly over pots supported on the head 21, preferably includes a pair of spreader bars 25 located on opposite sides of the column 13 and normally yieldingly mounted in substantially V position as shown in Figs. 1 and 8. Preferably, these bars 25 have extensible portions 26 which telescope within the upper ends of bars 25 with a friction fit, so that the bars 25 can be extended for supporting longer wrappers W if desired for wrapping large plants.

The means for yieldingly holding the bars 25 in extended V position preferably includes toggle arms 27 pivoted at their lower ends at 28 to intermediate portions of the bars, and pivoted at their upper ends at 29 to a crosshead 30 which is slidable on the column 13. A coil spring 31 is interposed between the top of the crosshead 30 and a collar 32 fixed on the column 13, and the spring 31 urges the bars outwardly to extended position, being compressed as shown in Fig. 5 when the bars are folded inwardly. Another spring 33 is interposed between the bottom of the crosshead and a collar 34 secured on the pedestal for yieldingly limiting the extending movement of the bars 25 when they are moved from the folded position outwardly, so as to prevent undue shock on the paper wrappers W which might otherwise be damaged or torn.

The bottom ends of the bars 25 are pivotally connected at 35 to inwardly angled links 36 attached at their bottom ends to adjusting nuts 37. Means is provided for adjusting the nuts toward and away from each other for adjusting the pivot points 35 to make the bars 25 fit different sizes of wrappers W as desired. The adjusting means may include a shaft 38 having opposite threads on its ends threadedly engaged by the nuts 37, and a pair of bevel gears 39 secured on the shaft 38 and engaged by a bevel ring gear 40. Thus, manual rotation of the ring gear 40 in one direction will cause the nuts 37 to move toward each other and rotation of the ring gear 40 in the opposite direction will move the nuts 37 away from each other.

Preferably a pair of toggle arms 41 is connected at their lower ends to the pivots 35 and at their upper ends to a crosshead 42 slidable on the column 13. A spring 43 interposed between the crosshead 42 and a collar 44 fixed on the column yieldingly urges the crosshead 42 downwardly to exert an outward pressure on the bottom ends of the spreader bars for tensioning the bottom ends of the nested wrappers W.

Means for resiliently frictionally holding or clamping the bottom end of the pack wrappers preferably includes the spring-actuated rollers 45, normally located one on the inside of the pack of wrappers and one on the outside, and engaging the wrappers at a point substantially above the bottom edge of the innermost wrapper W'. The rollers 45 may be mounted on the upper ends of wire loops 46, the lower ends of which are attached to a coil spring 47 for urging the rollers 45 toward each other. Thus when a pack of wrappers is positioned around the spreader bars 25 and between the rollers 45, as indicated in Fig. 3, a quick upward pull on the top of the innermost wrapper W' will release the wrapper and the spring tension of the rollers 45 will hold the remaining wrappers in position.

The tubular wrappers W are tapered or frusto-conical in shape, and are made into a closed tube preferably by overlapping and gluing the edges of a trapezoidal piece of tough floral wrapping paper. A plurality of these wrappers may be nested in folded condition one within the other, and the jack assumes a somewhat flattened shape as best indicated in Fig. 3.

In the operation of the novel plant wrapping device, the wrapper-supporting frame, including the column 13 with the spreader bars 25 foldably mounted thereon is detached from the stub 16 on the base and from the head 21. The bars 25 are then folded inwardly as indicated in dotted lines in Fig. 8, and a pack of the wrappers W is easily pulled over the bottom end of the bars until the bottom end of the wrappers is above the rollers 45. The bottom end portions of the wrappers W are then inserted and moved downwardly between the rollers 45 to the position shown in Figs. 3 and 8, at which time the bars are extended or spread apart to engage the fold lines on opposite sides of the innermost wrapper W'. In this position the wrappers are slightly stretched over the spreader bars 25 by means of the spring tension imparted by the springs 31 and 43 acting on the toggle arms 27 and 41, respectively.

Figure 7:
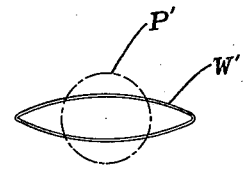
Fig. 7 is a diagrammatic plan view of the bottom end of one of the novel tubular wrappers, showing in dot-dash lines the circle into which the wrapper is formed as it is pulled upwardly over the base of the pot.
Figure 6:
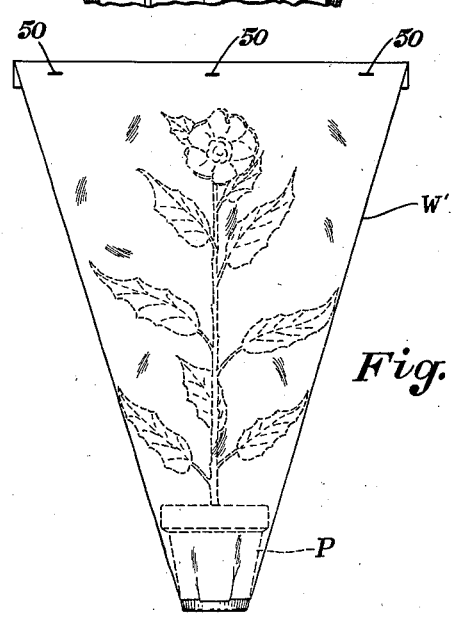
Fig. 6 is a front elevation of the plant in completely wrapped condition.

The wrapper-supporting frame with its pack of wrappers is now quickly attached to the stub 16 by means of the joint 14, 15, and a head 21 of the proper size to support the pot P is attached to the top end of the column by means of the joint 19, 20. Preferably each size of the wrappers W is adapted to be used with a range of two sizes of tapered pots P, the pots being of standard size. For example, one size of wrapper will accommodate either a 4-inch or a 5-inch diameter pot, and another size will accommodate either a 6-inch or a 7-inch diameter pot. As indicated in Fig. 7 the peripheral length of the wrapper W' at its bottom end is such that it will open out to a circle of the size indicated in dot-dash line P' which is adapted to fit tightly around the bottom portion of the pot P as indicated in Fig. 6. For a pot having a 1-inch larger diameter, the circle P' would fit tightly around a lower portion of the pot.

With the pot P on the head 21, as shown in Fig. 1, the operator inserts his two thumbs in the folds at opposite sides of the inner wrapper W' immediately above the extensions 26 at the top ends of the bars 25, and by then exerting a slight outward pressure he may give the innermost wrapper W' a quick upward pull to release it from the pack of nested wrappers W. While still holding the top end of the wrapper W', as indicated in Fig. 5, he continues to pull the wrapper upwardly and as the lower tapered end of the wrapper moves up along the bars 25 they are folded inwardly against the pressure of the spring 31 in the manner indicated in Fig. 5 until the wrapper W' is released. In order to guard against possible tearing of the bottom end of the wrapper, the upper ends of the extensions 26 are curved inwardly as indicated at 49.

As the wrapper W' is pulled further up over the pot P and around the plant, the small end of the wrapper will conform to and fit tightly around the lower end of the pot P as indicated in Fig. 6, so as not to require tying the wrapper, and the operator may then lift the plant off of the head 21 without changing his grip on the wrapper and place the wrapped plant on a nearby stand or table where the top edge of the wrapper may be folded over and stapled as indicated at 50 in Fig. 6. A plurality of potted plants can be placed on the head 21 in rapid succession, and each quickly wrapped by pulling successive wrappers upwardly from the inside of the pack in repeating the above-described operation.

It is to be noted that as the tapered tubular wrapper W' is pulled gently upward around the plant, the foliage or blooms of the plant will be gradually and gently turned upwardly and gathered inwardly without bending or breaking the same, as contrasted with the comparatively rough treatment to which the plant is subjected when it is laid on its side and rolled in wrapping paper. Moreover, the plant is kept in an upright position during the wrapping operation so that the soil in the pot is not disturbed or loosened, and the foliage or blooms need not be touched with the fingers at any time during the entire wrapping operation.

The novel plant wrapping device provides for storing a pack of wrappers in upright position to occupy a minimum of space, and eliminates the need for a large table-top space as required in the conventional method of rolling a plant on its side in a sheet of wrapping paper. Consequently, plants can be wrapped by unskilled persons without injury to the plants, and in an extremely short period of time, without causing congestion where several people are engaged in the wrapping operation.

In places where plants having a substantial variation in sizes of pots are wrapped, it may be desirable to provide several of the improved wrapping devices in side-by-side relation, as in a cabinet or the like, so that each device can accommodate a different range of sizes of pots, and thus practically all sizes of pots can be quickly wrapped at any time.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A potted plant wrapping device including a base, a column supported on the base, a head on top of the column supporting a flower pot, a pack of nested tubular tapered wrappers around said column, a pair of toggle arms mounted at their inner ends on the column below the head for yielding up and down movement, spreader bars pivotally mounted on the outer ends of said arms for movement between collapsed position and extended position engaging opposite sides of the innermost wrapper of said pack of nested tubular tapered wrappers holding them in position to be successively pulled upwardly around the pot supported on the head, the small ends of said wrappers being dimensioned to fit tightly around the lower portions of said pot, and means adjustably mounting the bottom ends of said spreader bars on said column for movement toward and away from each other for fitting various sizes of said wrappers.

2. A potted plant wrapping device including a base, a column supported on the base, a head on top of the column supporting a flower pot, a pack of nested tubular tapered wrappers around said column, a pair of toggle arms mounted at their inner ends of the column below the head for yielding up and down movement, and spreader bars pivotally mounted on the outer ends of said arms for movement between collapsed position and extended position engaging opposite sides of the innermost wrapper of said pack of nested tubular tapered wrappers holding them in position to be successively pulled upwardly around the pot supported on the head, the small ends of said wrappers being dimensioned to fit tightly around the lower portions of said pot.

3. A potted plant wrapping device including a base, a column detachably supported on the base, a head detachably mounted on top of the column, a pot supported on said head, a pair of spreader bars, means on the column below said head yieldingly supporting said bars in extended V position, a plurality of nested tapered tubular wrappers supported in substantially flat folded condition around and engaging said bars in position to be successively pulled upwardly around successive pots supported on the head, the lower ends of said wrappers being dimensioned to fit tightly around the lower portions of said pots, and means adjustably mounting the bottom ends of the spreader bars for relative movement to accommodate various sizes of wrappers for various sizes of pots.

4. A potted plant wrapping device including a base, a column detachably supported on the base, a head detachably mounted on top of the column, a pot supported on said head, a pair of spreader bars spaced entirely above the base, means on the column below said head yielding supporting said bars in extended V position, and a plurality of nested tapered tubular wrappers supported in substantially flat folded condition around and engaging said bars in position to be successively pulled upwardly around successive pots supported on the head, the lower ends of said wrappers being dimensioned to fit tightly around the lower portions of said pots.

5. In a potted plant wrapping device, a detachable wrapper frame including a column, a pair of spreader bars, means connected to the bottom ends and to intermediate portions of said bars foldably mounting said bars on said column, means yieldingly urging said bars normally to extended V position, and a pack of nested tapered tubular wrappers supported on said bars for being pulled successively over the bars, the small ends of said wrappers being dimensioned to fit tightly around the bottom portions of flowerpots in a particular size range.

6. In a potted plant wrapping device, a detachable wrapper frame including a column, a pair of spreader bars, means foldably mounting said bars on said column, means yieldingly urging said bars normally to extended V position with their lower ends relatively near to the column, a pack of nested tapered tubular wrappers supported in substantially flat folded condition around and engaging said bars for being pulled successively over the bars, the small ends of said wrappers being dimensioned to fit tightly around the bottom portions of flowerpots in a particular size range, and means adjustably connecting the near ends of said spreader bars relative to each other for accommodating various sizes of wrappers.

7. In a potted plant wrapping device, a detachable wrapper frame including a column, a pair of spreader bars, means foldably mounting said bars on said column, means yieldingly urging said bars normally to extended V position, a pack of nested tapered tubular wrappers around and engaging said bars for being pulled successively over the bars, the small ends of said wrappers being dimensioned to fit tightly around the bottom portions of flowerpots in a particular size range, and means on said frame resiliently pinching said pack of nested wrappers to facilitate separating the inner wrapper by an upward pull on the large end.

8. In a potted plant wrapping device, a detachable wrapper frame including a column, a pair of spreader bars, means foldably mounting said bars on said column, means yieldingly urging said bars normally to extended V position with their lower ends relatively near to the column, a pack of nested tapered tubular wrappers folded into substantially V-shape around and engaging said bars for being pulled successively over the bars, the small ends of said wrappers being dimensioned to fit tightly around the bottom portions of flowerpots in a particular size range, means adjustably connecting the near ends of said spreader bars relative to each other for accommodating various sizes of wrappers, and means on said frame resiliently pinching said pack of nested wrappers to facilitate separating the inner wrapper by an upward pull on the large end.

HENRY S. WILLIAMS.

REFERENCES CITED

The following references are of record in the file of this patent:

UNITED STATES PATENTS

| Number | Name | Date |
| --- | --- | --- |
| Re. 14,318 | Hayashi | June 19, 1917 |
| 1,851,676 | Litchfield | Mar. 29, 1932 |